(12) United States Patent
Inokuchi (10) Patent No.: US 7,531,241 B2
(45) Date of Patent: *May 12, 2009

(54) COATING AGENT

(75) Inventor: Yoshinori Inokuchi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 11/515,709

(22) Filed: Sep. 5, 2006

(65) Prior Publication Data

US 2007/0059538 A1    Mar. 15, 2007

(30) Foreign Application Priority Data

Sep. 9, 2005 (JP) ............................. 2005-262525
Mar. 23, 2006 (JP) ............................. 2006-080726

(51) Int. Cl.
*B32B 9/04* (2006.01)
*C08G 77/06* (2006.01)

(52) U.S. Cl. ............................. 428/447; 528/21; 528/22

(58) Field of Classification Search ............... 428/423.1
See application file for complete search history.

(56) References Cited

U.S. PATENT DOCUMENTS

| | | | | | |
|---|---|---|---|---|---|
| 3,903,031 | A | * | 9/1975 | Matsuda et al. ............. | 524/591 |
| 3,971,764 | A | * | 7/1976 | Schurmann et al. ........... | 528/65 |
| 4,127,872 | A | * | 11/1978 | Shen Lo ..................... | 369/276 |
| 4,429,082 | A | * | 1/1984 | Lee et al. .................... | 525/426 |
| 4,525,400 | A | * | 6/1985 | Surprenant .................... | 428/54 |
| 4,617,335 | A | * | 10/1986 | Okada et al. ................. | 524/265 |

(Continued)

FOREIGN PATENT DOCUMENTS

DE     25 43 966 A1    4/1977

(Continued)

OTHER PUBLICATIONS

European Search Report for European Application No. EP 06 29 1351, dated Mar. 14, 2008 (completion of search) and Apr. 22, 2008 (transmittal of search report).

*Primary Examiner*—Randy Gulakowski
*Assistant Examiner*—Robert Loewe
(74) *Attorney, Agent, or Firm*—Clark & Elbing LLP (57) ABSTRACT

An object of the present invention is to provide a coating agent capable of giving a coating film having excellent adhesion to the base surface, and exhibiting excellent releasability with good surface lubricity. The coating agent comprises a water-base resin composition containing the following components A and B:

component A: a curable silicone composition composed of:
  component (A-1): an organopolysiloxane in which a group selected from among a hydroxyl group and groups represented by the formula $R^1O$— (where $R^1$ is a monovalent hydrocarbon group having 1 to 6 carbon atoms), and a group represented by the following formula (1):

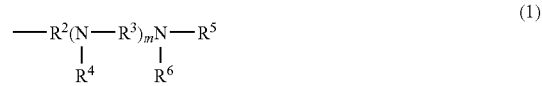

are bonded to the same silicon atom at two or more terminals of the polysiloxane chain,
  component (A-2): an alkoxy silane compound or a partial hydrolysis-condensation product thereof, and
  component (A-3): a condensation catalyst in an amount of 0 to 10 mass parts per 100 mass parts of the total amount of the components (A-1) and (A-2); and
component B: a polyurethane resin.

5 Claims, 1 Drawing Sheet

U.S. PATENT DOCUMENTS

| | | | |
|---|---|---|---|
| 4,661,551 A * | 4/1987 | Mayer et al. | 524/379 |
| 4,915,938 A * | 4/1990 | Zawadzki | 424/70.122 |
| 5,000,861 A * | 3/1991 | Yang | 428/391 |
| 5,021,290 A * | 6/1991 | Rowell | 428/319.3 |
| 5,300,241 A * | 4/1994 | Mikami et al. | 428/391 |
| 5,391,400 A * | 2/1995 | Yang | 427/389.9 |
| 5,496,401 A * | 3/1996 | Yang | 106/287.11 |
| 5,534,610 A * | 7/1996 | Bayly et al. | 528/38 |
| 5,538,793 A * | 7/1996 | Inokuchi et al. | 428/407 |
| 5,594,061 A * | 1/1997 | Sharma et al. | 524/503 |
| 5,945,185 A * | 8/1999 | Hirai et al. | 428/35.2 |
| 6,077,611 A * | 6/2000 | Griswold et al. | 428/423.3 |
| 6,077,966 A * | 6/2000 | Matsumura et al. | 556/425 |
| 6,147,157 A * | 11/2000 | Inokuchi et al. | 524/837 |
| 6,398,860 B1 * | 6/2002 | Ona et al. | 106/287.11 |
| 6,538,045 B1 * | 3/2003 | Murphy et al. | 522/71 |
| 6,579,325 B1 * | 6/2003 | Ludemann et al. | 8/128.3 |
| 6,783,806 B2 * | 8/2004 | Ludemann et al. | 427/387 |
| 7,291,402 B2 * | 11/2007 | Kazuhisa et al. | 428/626 |
| 2001/0047052 A1 * | 11/2001 | Spyropoulos et al. | 524/588 |
| 2003/0050420 A1 * | 3/2003 | Pickering et al. | 528/10 |
| 2005/0004306 A1 * | 1/2005 | Lubnin et al. | 524/589 |
| 2005/0008794 A1 * | 1/2005 | Graczyk et al. | 428/32.24 |
| 2005/0148752 A1 * | 7/2005 | Klaassens et al. | 528/38 |
| 2005/0215806 A1 * | 9/2005 | Heller et al. | 556/413 |
| 2005/0277718 A1 * | 12/2005 | Johnson | 524/261 |
| 2006/0217016 A1 * | 9/2006 | Lin et al. | 442/59 |
| 2006/0222870 A1 * | 10/2006 | Inokuchi | 428/447 |

FOREIGN PATENT DOCUMENTS

| | | |
|---|---|---|
| GB | 1 532 971 A | 11/1978 |
| JP | 2005306994 A * | 11/2005 |

* cited by examiner

COATING AGENT

CROSS-REFERENCE TO RELATED APPLICATIONS

This application claims priority from Japanese Patent Application Nos. JP2005-262525, filed on Sep. 9, 2005, and JP2006-080726, filed on Mar. 23, 2006, the disclosures of which are incorporated herein by reference.

BACKGROUND OF THE INVENTION

1. Field of the Invention

The present invention relates to a coating agent that gives a coating film with excellent adhesion to the base material and with excellent releasability and surface lubricity

2. Description of the Related Art

A method used in the past to impart releasability and smoothness to the surface of a base material consisting of a plastic, metal, or rubber was to coat the surface of the base material with a silicone resin composition, then cure this coating to form a film, so that the surface of the base material was coated with this coating film.

Examples of silicone resin compositions used for this purpose include a composition composed of an amino group-containing alkoxysilane and an epoxy group-containing organopolysiloxane (see Japanese Laid-Open Patent Application S54-43891); a composition composed of a hydroxy group-containing organopolysiloxane, an organohydrogenpolysiloxane, an amino group-containing alkoxysilane, and an epoxy group-containing alkoxysilane (see Japanese Laid-Open Patent Application S52-123394); a composition composed of a hydroxy group-containing organopolysiloxane, an organohydrogenpolysiloxane, an epoxy group-containing organopolysiloxane, and an amino group-containing alkoxysilane (see Japanese Laid-Open Patent Applications S54-45361, S54-90369, and S54-90375); a composition composed of a hydroxy group-containing organopolysiloxane, an organohydrogenpolysiloxane, and a hydrolyzate-condensate of an amino group-containing dialkoxysilane (see Japanese Laid-Open Patent Application H7-109441); a composition composed of a hydroxy group- or vinyl group-containing organopolysiloxane, an organohydrogenpolysiloxane, and dimethylpolysiloxane (see Japanese Laid-Open Patent Application S62-215667); a composition composed of a reaction product of an amino group-containing silane or siloxane and an epoxy group-containing silane or siloxane, a hydroxy group-containing polydiorganosiloxane, and a organohydrogenpolysiloxane (see Japanese Laid-Open Patent Application S56-78960); a composition composed of a product of a reaction of a silane or siloxane containing an amino group and an alkoxy group with a silane or siloxane containing an epoxy group and an alkoxy group, and an organopolysiloxane containing an alkoxy group or a hydroxy group and an amino group (see Japanese Laid-Open Patent Application H11-43647); a composition composed of an organopolysiloxane containing a hydroxy group and an epoxy group, an alkoxy silane containing an amino group, and an alkoxy silane containing a mercapto group (see Japanese Laid-Open Patent Application H5-5082); and a composition composed of a hydroxy group-containing diorganosilane, an epoxy resin, and an amino group-containing silane (see Japanese Laid-Open Patent Application H4-318021).

The compositions listed above are organic solvent solutions, and no specific examples of water-based resin compositions are given. Problems are encountered in the use of compositions in the form of an organic solvent solution relative to ignition and environmental pollution In view of this, water-based resin compositions of silicone resins have been proposed, examples of which include a composition composed of a hydroxy group-containing organopolysiloxane, an organohydrogenpolysiloxane, and a hydrolyzate-condensate of an amino group-containing dialkoxysilane (see Japanese Laid-Open Patent Application H7-126417); a composition composed of an organopolysiloxane containing a hydrolyzable group, an organopolysiloxane containing an epoxy group or an amino group and a hydrolyzable group, and a hydrolyzable silane containing an epoxy group or an amino group (see Japanese Laid-Open Patent Application H7-196984); a composition composed of a hydroxy group-containing diorganopolysiloxane, an organohydrogen polysiloxane, a water-soluble group-containing organopolysiloxane, an aminosilane compound, an epoxysilane compound, a carboxylic acid, and an alkylamine oxide (see Japanese Laid-Open Patent Application 2002-188057); a composition composed of an acrylic-silicone graft copolymer, a hydrolyzate-condensate of an amino group-containing dialkoxysilane, and an epoxy group-containing organopolysiloxane (see Japanese Laid-Open Patent Application H7-109440); and a composition composed of a polydiorganosiloxane, a urethane resin, and an epoxy group-containing silane (see Japanese Laid-Open Patent Application 2005-125656).

SUMMARY OF THE INVENTION

However, the water-based resin compositions of silicone resins discussed in "Prior Art" do not have satisfactory adhesion to a base material, and the coating films obtained from these compositions have poor releasability and surface smoothness.

It is an object of the present invention to solve the problems encountered with the above-mentioned conventional coating agents composed of silicone resin compositions, and to provide a water-based coating agent exhibiting excellent adhesion to the surface of plastics, metals, and rubbers, and when a coating layer thereof is cured, a coating film having excellent releasability and surface smoothness can be obtained.

To achieve the stated object, the present invention provides a coating agent composed of a water-based resin composition containing the following components A and B.

Component A: 100 parts by mass of a curable silicone composition composed of:

Component (A-1): an organopolysiloxane in which a group selected from among a hydroxyl group and groups represented by the formula $R^1O$— (where $R^1$ is a monovalent hydrocarbon group having 1 to 6 carbon atoms), and a group represented by the general formula (1):

where $R^2$ is a substituted or unsubstituted divalent hydrocarbon group having 1 to 6 carbon atoms, $R^3$ is a divalent hydrocarbon group having 1 to 4 carbon atoms, $R^4$, $R^5$, and $R^6$ are each a hydrogen atom or a substituted or unsubstituted monovalent hydrocarbon group having 1 to 10 carbon atoms, m is an integer from 0 to 6 with the provise that, when m is not 0, at least one of $R^4$, $R^5$, and $R^6$ is a hydrogen atom, and when m is 0, at least one of $R^5$ and $R^6$ is a hydrogen atom, as bonded to the same silicon atoms at two or more terminals of the polysiloxane chain, Component (A-2): an alkoxy silane compound represented by the following general formula (2):

$$R^7{}_aSi(OR^8)_{4-a} \quad (2)$$

where $R^7$ is a substituted or unsubstituted monovalent hydrocarbon group having 1 to 20 carbon atoms, each $R^8$ is independently a monovalent hydrocarbon group having 1 to 6 carbon atoms, and a is 0 or 1, or a partial hydrolyzate-condensate thereof, and Component (A-3): a condensation catalyst in an amount of 0 to 10 parts by mass per 100 parts by mass of the total amount of the component (A-1) and component (A-2); and Component B: 10 to 200 parts by mass of a polyurethane resin.

The coating agent of the present invention has excellent adhesion, and, when used to coat a base material composed of a rubber such as ethylene-propylene-diene rubbers, butyl rubbers, natural rubber, chloroprene rubbers, isoprene rubbers, butadiene rubbers, nitrile rubbers, styrene-butadiene rubbers, or acrylic rubbers, plastics such as polyethylenes, polypropylenes, polyesters, methacrylic resins, polycarbonates, epoxy resins, polystyrenes, phenolic resins, or polyvinyl chlorides, or a metal such as iron, aluminum, stainless steels, or copper, and then cured at room temperature or under heating, this coating agent forms a coating film having excellent releasability and smoothness. It is therefore useful as a coating agent for metal molds, plastic molds, and rubber molds used in the molding works of rubbers and plastics. Also, because a rubber article treated with the coating agent of the present invention has this excellent surface smoothness, it is useful as a material for weatherstrips of automobiles, O-rings, gaskets, various kinds of packings and other sealing materials, rubber hose materials, and so on.

DESCRIPTION OF THE PREFERRED EMBODIMENTS

The present invention is now described in detail.

As discussed above, the coating agent of the present invention is a water-based resin composition comprising the component A and the component B.

Component A of the coating agent of the present invention consists of two essential components, namely, the component (A-1) and the component (A-2), and open optional component, namely, the component (A-3).

The organopolysiloxane of the component (A-1) has a structure in which (i) a group selected from among a hydroxyl group and groups represented by the general formula $R^1O-$ where $R^1$ is a monovalent hydrocarbon group having 1 to 6 carbon atoms and (ii) a group represented by the formula (1) are bonded to one and the same silicon atom at two or more terminals of the polysiloxane chain. The structure of the organopolysiloxane of the component (A-1) may be linear, branched, or cyclic with two or more branches, but a linear molecular structure is preferable. With the present invention, the organopolysiloxane of the component (A-1) is usually one of which the average degree of polymerization is from 10 to 2000.

In the organopolysiloxane as the component (A-1), the above-mentioned groups (i) and (ii) may be such that at least one group (i) and one group (ii) (that is, a total of two groups) are bonded to one and the same silicon atom at a terminal of the polysiloxane chain. For the purpose of storage stability, it is particularly preferable for the organopolysiloxane as the component (A-1) to have one or two of each of the above-mentioned groups (i) and (ii) bonded to each of at least two, and preferably two to five, silicon atoms at the terminals of the polysiloxane chain, and even more preferably to each of two silicon atoms.

Examples of the above-mentioned $R^1$ in the above-mentioned group (i) include a methyl group, ethyl group, propyl group, isopropyl group, butyl group, tert-butyl group, pentyl group, hexyl group, and other alkyl groups, of which a methyl group is preferred.

In the formula (1), $R^2$ is a substituted or unsubstituted divalent hydrocarbon group having 1 to 6 carbon atoms. Examples of $R^2$ include a methylene group, ethylene group, trimethylene group, tetramethylene group, pentamethylene group, hexamethylene group, and other alkylene groups; a p-phenylene group and other arylene groups; and the above-mentioned hydrocarbon groups in which some or all of the hydrogen atoms are substituted by fluorine atoms, chlorine atoms, or bromine atoms such as a 1-chlorotrimethylene group. Of these, trimethylene group is preferred.

In the formula, $R^3$ is a divalent hydrocarbon group having 1 to 4 carbon atoms. Examples of $R^3$ include a methylene group, ethylene group, trimethylene group, tetramethylene group, and other alkylene groups. Of these, ethylene group is preferred.

In the formula (1), $R^4$, $R^5$, and $R^6$ are each a hydrogen atom or a substituted or unsubstituted monovalent hydrocarbon group having 1 to 10 carbon atoms. $R^4$, $R^5$, and $R^6$ each can be the same as or different from the others, and examples thereof include a hydrogen atom; methyl group, ethyl group, propyl group, isopropyl group, butyl group, tert-butyl group, pentyl group, hexyl group, octyl group, decyl group, and other alkyl groups; cyclopentyl group, cyclohexyl group, and other cycloalkyl groups; vinyl group, allyl group, and other alkenyl groups; phenyl group, tolyl group, and other aryl groups; a benzyl group, 2-phenylethyl group, and other aralkyl groups; and the above-mentioned hydrocarbon groups in which a part or all of the hydrogen atoms are substituted by fluorine atoms, chlorine atoms, or bromine atoms, such as 3-chloropropyl group, 3,3,3-trifluoropropyl group, and other halogen-substituted alkyl groups. Of these, a hydrogen atom and methyl group are preferred.

In Formula (1), m is an integer from 0 to 6; when m is not 0, at least one of $R^4$, $R^5$, and $R^6$ is a hydrogen atom and, when m is 0, at least one of $R^5$ and $R^6$ is a hydrogen atom.

Particularly preferable examples of the groups represented by the formula (1) are given below, but the present invention is not limited to or by these examples.

—$C_3H_6NH_2$,
—$C_3H_6NHC_2H_4NH_2$,
—$C_3H_6(NHC_2H_4)_2NH_2$,
—$C_3H_6(NHC_2H_4)_3NH_2$,
—$C_3H_6NHCH_3$,
—$C_3H_6NHC_2H_4NHCH_3$

A linear organopolysiloxane represented by the following formula (3) or (4) is particularly preferable as the organopolysiloxane of the component (A-1).

In the formula (3), each $R^9$ is independently a hydrogen atom or a monovalent hydrocarbon group having 1 to 6 carbon atoms. Examples of the monovalent hydrocarbon group of $R^9$ are the same as those given for $R^1$, or namely, methyl group, ethyl group, propyl group, isopropyl group, butyl group, tert-butyl group, pentyl group, hexyl group, and other alkyl groups, of which methyl group is preferred.

In the Formula (3), each of $R^{10}$ and $R^{12}$ is independently a monovalent hydrocarbon group having 1 to 20 carbon atoms. Examples of $R^{10}$ and $R^{12}$ include methyl group, ethyl group, propyl group, isopropyl group, butyl group, tert-butyl group, pentyl group, hexyl group, octyl group, decyl group, dodecyl group, tetradecyl group, hexadecyl group, octadecyl group, icosyl group, and other alkyl groups; cyclopentyl group, cyclohexyl group, and other cycloalkyl groups; vinyl group, allyl group, and other alkenyl groups; phenyl group, tolyl group, and other aryl groups; benzyl group, 2-phenylethyl group, and other aralkyl groups; and the above-mentioned hydrocarbon groups in which a part or all of the hydrogen atoms are substituted by fluorine atoms, chlorine atoms, or bromine atoms, such as a 3-chloropropyl group, 3,3,3-trifluoropropyl group, and other halogen-substituted alkyl groups, or other monovalent hydrocarbon groups having 1 to 20, or preferably 1 to 6, carbon atoms. For industrial purposes, or to endow releasing performance, it is particularly preferable that at least 90% by moles of the multiplicity of $R^{12}$ groups are methyl groups.

In Formula (3), $R^{11}$ is a group represented by the above-mentioned Formula (1).

In the formula (3), n is an integer from 10 to 2000, or preferably from 20 to 1700. If n is smaller than 10, there may be a disadvantage that the resulting coating film be fragile, but if it is over 2000, the viscosity of the above-mentioned organopolysiloxane may be too high for it to be microdispersed in the emulsification system (discussed below), making it difficult to obtain an emulsion with good storage stability.

There are no particular limitations on the method for preparing the organopolysiloxane of the component (A-1), but an example is a method in which an α,ω-dihydroxy-dimethylpolysiloxane and a dialkoxysilane compound having an alkylamino group bonded to a silicon atom are subjected to a dealcoholation condensation reaction.

Also, in the present invention an organic acid may be reacted with the organopolysiloxane of the component (A-1). The organic acid reacts with the aminoalkyl groups in the organopolysiloxane and forms an amine salts (that is, ion pairs), and this allows the component A to be rendered hydrophilic, so that it can be dispersed with an increase of the microscopic fineness in the aqueous medium (discussed below).

There are no particular limitations on the organic acid insofar as it is able to form the above-mentioned amine salt, but examples include formic acid, acetic acid, propionic acid, malonic acid, citric acid, and other aliphatic carboxylic acids having 1 to 6 carbon atoms in a molecule; methanesulfonic acid, ethanesulfonic acid, and other sulfonic acids having 1 to 6 carbon atoms in a molecule; and ethanesulfinic acid and other sulfinic acids having 1 to 6 carbon atoms in a molecule. Of these, formic acid and acetic acid are particularly preferable. These organic acids may be used singly or in combination of two or more kinds.

The amount in which the organic acid is added is preferably not exceeding 1 molar equivalent relative to the amino groups of the aminoalkyl groups.

Component (A-2) functions as a crosslinking agent for the component (A-1), and is an alkoxysilane represented by the following formula (2) and/or a partial hydrolysis-condensation product thereof.

$$R^7{}_a Si(OR^8)_{4-a}$$

In Formula (2), a is 0 or 1, and $R^7$ is a substituted or unsubstituted monovalent hydrocarbon group having 1 to 20 carbon atoms. Examples of $R^7$ include a methyl group, ethyl group, propyl group, isopropyl group, butyl group, tert-butyl group, pentyl group, hexyl group, octyl group, decyl group, dodecyl group, tetradecyl group, hexadecyl group, octadecyl group, icosyl group, and other alkyl groups; a cyclopentyl group, cyclohexyl group, and other cycloalkyl groups; a vinyl group, allyl group, and other alkenyl groups; a phenyl group, tolyl group, and other aryl groups; a benzyl group, 2-phenylethyl group, and other aralkyl groups; the above-mentioned hydrocarbon groups in which a part or all of the hydrogen atoms are substituted by fluorine atoms, chlorine atoms, bromine atoms, or other halogen atoms, or with a group substituted by functional groups containing mercapto group, acryloyloxy group, amino group, or the like, such as a 3,3,3-trifluoropropyl group, 3-chloropropyl group, or other halogenated alkyl group; a γ-methacryloyloxypropyl group, γ-acryloyloxypropyl group, or other acryloyloxyalkyl group; a γ-mercaptopropyl group or other mercaptoalkyl groups; and a substituted or unsubstituted monovalent hydrocarbon group having 1 to 20, or, preferably 1 to 6, carbon atoms, such as an N-β(aminoethyl)-γ-aminopropyl group, γ-aminopropyl group, or other aminoalkyl groups. Of these, a methyl group, phenyl group, vinyl group, γ-acryloyloxypropyl group, γ-methacryloyloxypropyl group, and 3,3,3-trifluoropropyl group are preferred.

In Formula (2), each $R^8$ is independently a monovalent hydrocarbon group having 1 to 6 carbon atoms. Examples of $R^8$ include a methyl group, ethyl group, propyl group, isopropyl group, butyl group, tert-butyl group, pentyl group, hexyl group, and other alkyl groups, of which a methyl group and ethyl group are preferred.

Specific examples of the alkoxysilane represented by Formula (2) above, when the above-mentioned a is 1, include methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane, butyltrimethoxysilane, pentyltrimethoxysilane, hexyltrimethoxysilane, octyltrimethoxysilane, decyltrimethoxysilane, dodecyltrimethoxysilane, tetradecyltrimethoxysilane, octadecyltrimethoxysilane, phenyltrimethoxysilane, phenyltriethoxysilane, vinyltrimethoxysilane, vinyltriethoxysilane, γ-acryloyloxypropyltrimethoxysilane, γ-acryloyloxypropyltriethoxysilane, γ-methacryloyloxypropyl trimethoxysilane, γ-methacryloyloxypropyltriethoxysilane, 3,3,3-trifluoropropyltrimethoxysilane, and 3,3,3-trifluoropropyl triethoxysilane; when a is 0, examples include tetramethoxysilane, tetraethoxysilane, tetrapropoxysilane, and tetrabutoxysilane, as well as partially hydrolyzed condensates of these alkoxysilanes.

Of these, it is preferable to use methyltrimethoxysilane, methyltriethoxysilane, phenyltrimethoxysilane, phenyltriethoxysilane, vinyltrimethoxysilane, vinyltriethoxysilane, γ-acryloyloxypropyltrimethoxysilane, γ-acryloyloxypropyltriethoxysilane, γ-methacryloyloxypropyltrimethoxysilane, γ-methacryloyloxypropy triethoxysilane, 3,3,3-trifluoropropyltrimethoxysilane, 3,3,3-trifluoropropyltriethoxysilane, tetramethoxysilane, or tetraethoxysilane.

These components (A-2) can be used singly or in combinations of two kinds or more.

Component (A-2) is a crosslinking agent for the component (A-1), and can be cured through a condensation reaction to obtain a silicone elastomer. This condensation reaction is only a condensation reaction between the hydroxy groups and/or $R^1O$— groups in component (A-1) and the $R^8O$— groups in component (A-2), but a condensation reaction between the $R^8O$— groups in component (A-2) is also included.

The amount in which component (A-2) is used relative to the component A-1 is usually such that the amount of $R^8O$— groups in the component (A-2) is from 0.5 to 100 moles, and preferably 1.0 to 50 moles, per mole of the total amount of hydroxy groups and $R^1O$— groups in the component (A-1).

If yjr component (A-2) is used in a too small amount, the condensation curing reaction may be so inadequate that it is impossible to obtain a silicone elastomer. If the amount is too large, though, there may be too much condensation reaction between the $R^8O$— groups in the component (A-2), so the cured product will be too hard and have poor elasticity, or there may be a large amount of by-product alcohols.

The component (A-3) is a condensation catalyst for promoting the above-mentioned condensation reaction, and is one or a combination of metal compounds selected from among sodium compounds, aluminum compounds, potassium compounds, calcium compounds, vanadium compounds, iron compounds, cobalt compounds, nickel compounds, zinc compounds, zirconium compounds, and barium compounds.

Specific examples include sodium 2-ethylhexanoate, aluminum 2-ethylhexanoate, potassium 2-ethylhexanoate, calcium 2-ethylhexanoate, vanadium 2-ethylhexanoate, iron 2-ethylhexanoate, cobalt 2-ethylhexanoate, nickel 2-ethylhexanoate, zinc 2-ethylhexanoate, zirconium 2-ethylhexanoate, barium 2-ethylhexanoate, sodium neodecanoate, aluminum neodecanoate, potassium neodecanoate, calcium neodecanoate, vanadium neodecanoate, iron neodecanoate, cobalt neodecanoate, nickel neodecanoate, zinc neodecanoate, zirconium neodecanoate, barium neodecanoate, sodium oleate, aluminum oleate, potassium oleate, calcium oleate, vanadium oleate, iron oleate, cobalt oleate, nickel oleate, zinc oleate, zirconium oleate, barium oleate, sodium naphthenate, aluminum naphthenate, potassium naphthenate, calcium naphthenate, vanadium naphthenate, iron naphthenate, cobalt naphthenate, nickel naphthenate, zinc naphthenate, zirconium naphthenate, barium naphthenate, and other metal carboxylates; aluminum acetylacetonate, calcium acetylacetonate, cobalt acetylacetonate, iron acetylacetonate, nickel acetylacetonate, zinc acetylacetonate, zirconium acetylacetonate, aluminum ethylacetonate, calcium ethylacetonate, cobalt ethylacetonate, iron ethylacetonate, nickel ethylacetonate, zinc ethylacetonate, zirconium ethylacetonate, and other such organometal complexes; sodium chloride, aluminum chloride, potassium chloride, calcium chloride, vanadium chloride, iron chloride, cobalt chloride, nickel chloride, zinc chloride, zirconium chloride, barium chloride, sodium sulfate, aluminum sulfate, potassium sulfate, calcium sulfate, vanadium sulfate, iron sulfate, cobalt sulfate, nickel sulfate, zinc sulfate, zirconium sulfate, barium sulfate, sodium nitrate, aluminum nitrate, potassium nitrate, calcium nitrate, vanadium nitrate, iron nitrate, cobalt nitrate, nickel nitrate, zinc nitrate, zirconium nitrate, barium nitrate, sodium phosphate, aluminum phosphate, potassium phosphate, calcium phosphate, vanadium phosphate, iron phosphate, cobalt phosphate, nickel phosphate, zinc phosphate, zirconium phosphate, barium phosphate, sodium carbonate, aluminum carbonate, potassium carbonate, calcium carbonate, vanadium carbonate, iron carbonate, cobalt carbonate, nickel carbonate, zinc carbonate, zirconium carbonate, barium carbonate, and other such inorganic metal salts; and sodium hydroxide, aluminum hydroxide, potassium hydroxide, calcium hydroxide, vanadium hydroxide, iron hydroxide, cobalt hydroxide, nickel hydroxide, zinc hydroxide, zirconium hydroxide, barium hydroxide, and other metal hydroxides. These can be used singly or in combinations of two or more kinds.

Tin compounds can also be used as the component (A-3) either singly or as a combination with other compounds, but addition thereof is not recommended due to the toxicity of tin compounds in general which is deemed as an environmental problem in recent years.

The amount in which the component (A-3) is added is usually from 0 to 10 parts by mass, and preferably about 0 to 2 parts by mass, per 100 parts by mass of the total of the component (A-1) and component (A-2). If the component (A-3) is ever added, it usually should be added in an amount of at least 0.1 part by mass. If the reactivity of the component (A-1) and component (A-2) is high enough, the component (A-3) need not be added, or only a very small amount is sufficient, but an excessive amount of the component (A-3) has no particular additional advantage in promotion of the reaction rather with a disadvantage due to an increase in the cost.

If the catalytic activity is of the component A-3 is too low and no sufficient curing of the composition can be obtained with the component (A-3) alone, it is optional that an alkoxysilane containing an amino group, or an amine compound is jointly added as an auxiliary catalyst.

In order to obtain the coating agent of the present invention as a water-base resin composition, the component A must be added in the form of an aqueous emulsion with the component B. An aqueous emulsion of the component A can be obtained by using a surfactant to emulsify the above-mentioned component (A-1), component (A-2), and component (A-3), if used, or only the component (A-1) and component (A-2), in water.

There are no particular limitations on the surfactant used in this case, and examples thereof include nonionic surfactants, anionic surfactants, cationic surfactants and amphoteric surfactants. Examples of the nonionic surfactants include polyoxyethylene alkyl ethers, polyoxyethylene-polyoxypropylene alkyl ethers, polyoxyethylene alkylphenyl ethers, polyethyleneglycol fatty acid esters, sorbitan fatty acid esters, polyoxyethylene sorbitan fatty acid esters, polyoxyethylene sorbitol fatty acid esters, glycerol fatty acid ester, polyoxyethylene glycerol fatty acid esters, polyglycerol fatty acid esters, propylene glycol fatty acid esters, polyoxyethylene castor oil, polyoxyethylene hydrogenated castor oil, polyoxyethylene hydrogenated castor oil fatty acid esters, polyoxyethylene alkylamines, polyoxyethylene fatty acid amides, polyoxyethylene-modified organopolysiloxanes, and polyoxyethylene-polyoxypropylene-modified organopolysiloxanes. Examples of the anionic surfactants include alkyl sulfates, polyoxyethylene alkyl ether sulfates, polyoxyethylene alkylphenyl ether sulfates, N-acyl taurates, alkylbenzenesulfonates, polyoxyethylene alkylphenyl ether sulfonates, α-olefin sulfonates, alkylnaphthalene sulfonates, alkyldiphenyl ether disulfonates, dialkyl sulfosuccinates, monoalkyl sulfosuccinates, polyoxyethylene alkyl ether sulfosuccinates, fatty acid salts, polyoxyethylene alkyl ether acetates, N-acyl amino acid salts, alkenyl succinates, alkyl phosphates, polyoxyethylene alkyl ether phosphates, polystyrene sulfonates, naphthalenesulfonic acid-formalin condensates, aromatic sulfonic acid-formalin condensates, polymeric carboxylic acids, and styrene oxyalkylenic anhydride copolymers. Examples of cationic surfactants include alkyltrimethy ammonium salts, dialkyldimethyl ammonium salts, polyoxyethylene alkyldimethyl ammonium salts, dipolyoxyethylene alkylmethyl ammonium salts, tripolyoxyethylene alkyl ammonium salts, alkylbenzyldimethyl ammonium salts, alkylpyridinium salts, monoalkylamine salts, and monoalkylamidoamine salts. Examples of the amphoteric surfactants include alkyldimethylamine oxides, alkyldimethyl carboxybetaine, alkylamide propyldimethyl carboxybetaine, alkylhydroxysulfobetaines, and alkylcarboxymethylhydroxyethyl imidazolinium betaines. These surfactants can be used either singly or as a combination or two kinds or more, if compatible.

In order to obtain an aqueous emulsion of the component A from the component (A-1), component (A-2), and component (A-3) using a surfactant, a mixture of the organopolysiloxane as the component (A-1), the alkoxysilane and/or a partial hydrolysis-condensation product thereof as the component (A-2), and the metal compound as the component (A-3) is emulsified in water by using a surfactant. In the preparation of the aqueous emulsion of the component A, if the curing reaction of the component A-1 should proceed before a sufficiently uniform aqueous emulsion is formed, so that component A-1 cannot be emulsified, this drawback can be mitigated by a method in which the component (A-1) is first emulsified in water using a surfactant, and then the component (A-2) and component (A-3) are added under agitation, or a method in which a mixture of the component (A-1) and component (A-2) is first emulsified in water using a surfactant, and then the component (A-3) is added and stirred, or a method in which first a mixture of component (A-1) and component (A-3) is emulsified in water using a surfactant, and then the component (A-2) is added under agitation.

Also, if the component (A-3) is soluble in water, it is possible to employ a method in which the component (A-1) alone or a combination of the component (A-1) and component (A-2) is emulsified in water, and the component (A-3) is then added, or a method in which the component (A-3) is dissolved in water ahead of time, and the component (A-1) alone or a combination of the component (A-1) and component (A-2) is emulsified in this solution.

In order to obtain an aqueous emulsion of the component A from the component (A-1) and the component (A-2) using a surfactant, a mixture of the organopolysiloxane as the component A-1 and the alkoxysilane and/or a partial hydrolysis-condensation product thereof as the component A-2 is emulsified in water using a surfactant. In the preparation of the aqueous emulsion of the component A, if the curing reaction of the component A-1 proceeds so as to disturb emulsification of the component A, it is possible to first emulsify the component (A-1) alone followed by the addition of the component (A-2) under agitation.

Propeller blades, paddle blades, homomixers, disper-mixers, or other stirrers, or high-pressure homogenizers, colloid mills, ultrasonic emulsifiers, or other emulsification apparatus can be used to obtain an emulsion of the component A.

The total contents of the component (A-1) and component (A-2) are contained in the aqueous emulsion of the component A is usually 5 to 80% by mass, and preferably about 10 to 60% by mass. Adding in too small an amount is disadvantageous in terms of cost, but if the amount is too large, the viscosity of the aqueous emulsion may be unduly high to cause difficulties in handling.

The component B, which serves to increase adhesion between the substrate surface and the coating film obtained by coating with the coating agent of the present invention, is a polyurethane resin obtained by the addition reaction of a polyol which is a compound containing two or more hydroxyl groups —OH in a molecule and a polyisocyanate compound containing two or more isocyanate groups —NCO in a molecule.

Examples of the above-mentioned polyol compound include polyester polyols, polyether polyols, polycarbonate polyols, polycaprolactone polyols, polythioether polyols, polyacetal polyols, polytetramethylene glycols, polybutadiene polyols, polyisoprene polyols, hydrogenated polybutadiene polyols, and castor oil polyols. Mixtures of these can also be used. Of these, the polyester polyols or polyether polyols are preferable. The polyol preferably has a number average molecular weight of from 400 to 5,000.

Compounds that can be used as the above-mentioned polyisocyanate include diphenylmethane diisocyanate, polymethylene polyphenylene polyisocyanate, tolylene diisocyanate, polytolylene polyisocyanate, xylene diisocyanate, naphthalene diisocyanate, and other aromatic polyisocyanates; hexamethylene diisocyanate and other aliphatic polyisocyanates; and dicyclohexylmethane diisocyanate, isophorone diisocyanate, hydrogenated xylene diisocyanate, and other alicyclic polyisocyanates. In addition to these, polyisocyanates obtained by modifying the above-mentioned polyisocyanates with a carbodiimide, polyisocyanates obtained by modifying the above-mentioned polyisocyanates with a isocyanurate, or the like can also be used. These can be used singly or in a mixture. Of these, diphenylmethane diisocyanate, tolylene diisocyanate, and hexamethylene diisocyanate are particularly preferable.

To obtain the coating agent of the present invention as a water-base resin composition, component B must be added in the form of an aqueous emulsion with the component A. An aqueous emulsion or aqueous solution of the component B can be obtained by subjecting a polyol and an excess amount of a polyisocyanate to an addition reaction in a proportion such that the molar ratio of polyol:polyisocyanate is from 1:1.1 to 1:10, and preferably from 1:1.3 to 1:5, thereby synthesizing a urethane prepolymer having isocyanate groups at the molecular terminals, and then using a surfactant to emulsify or dissolve this urethane prepolymer in water. If the polyol:polyisocyanate molar ratio is smaller than the range, addition polymerization will tend to occur steadily, producing a high-molecular weight polymer, but if the ratio is larger than the range, a large amount of free isocyanate residues may be produced, thereby decreasing storage stability.

There are no particular limitations on the above-mentioned surfactant, and examples include the nonionic surfactants, anionic surfactants, cationic surfactants, and amphoteric surfactants mentioned above. The emulsification apparatus mentioned above can be used for the emulsification or solubilization discussed above.

When an aqueous emulsion or aqueous solution of the component B is prepared, the above-mentioned polyol and polyisocyanate are added, a urethane polymer is synthesized using a compound having salt-forming groups and active hydrogen atoms that will react with the isocyanate groups, and the urethane polymer thus obtained is emulsified or solubilized in water using a salt-forming agent.

Examples of the compounds having salt-forming groups and active hydrogen atoms reactive with isocyanate groups include hydroxy acids, aminocarboxylic acids, aminosulfonic acids, and hydroxysulfonic acids. Salt-forming agents for these include metal hydroxides, ammonia, tertiary amine compounds, and so on.

Examples of other compounds having salt-forming groups and active hydrogen atoms to react with isocyanate groups, besides those listed above, include aminoalcohols, amines, and so on, and salt-forming agents for these include compounds having organic acids, inorganic acids and reactive halogen atoms.

Examples of other compounds having salt-forming groups and active hydrogen atoms to react with isocyanate groups, besides those listed above, include alcohols having halogen atoms, and salt-forming agents for these include tertiary amines, sulfides, phosphines, and so on. The above-mentioned surfactant may be used concurrently in this method. The salt-forming agent is usually added in an equal amount.

Also, when an aqueous emulsion or aqueous solution as the component B is prepared, the above-mentioned polyol and polyisocyanate and a polyoxyethylene monoalkyl ether and/or polyoxyethylene/polyoxypropylene monoalkyl ether are used for synthesizing a urethane polymer, and the urethane polymer thus obtained is emulsified or solubilized in water. The above-mentioned surfactant may be used concurrently in this method.

The urethane polymer in the aqueous emulsion or solution can be made into an aqueous emulsion or solution of the polyurethane resin as the component B by converting to a high-molecular weight polymer by reacting with water, or by adding a polyvalent amine compound to the resulting aqueous emulsion or solution and converting to a high-molecular weight polymer by reacting with the polyvalent amine compound.

The polyurethane resin as the component B obtained in this manner preferably has a number-average molecular weight of from 4000 to 100,000.

The amount in which the component B is added is from 10 to 200 parts by mass, and preferably 15 to 150 parts by mass, and more preferably 20 to 100 parts by mass, per 100 parts by mass of the component A. If the added amount is smaller than 10 parts by mass, the coating film obtained from the composition will have poor adhesion to a rubber surface, but if it is over 200 parts by mass, the coating film obtained from the composition will have poor releasability and surface lubricitys.

To an extent that the advantages of the present invention are not decreased, paraffin waxes, polyethylene waxes, silicone oils, carbon black, organic resin powders, inorganic powders, various organic pigments and inorganic pigments, wetting agents, thickeners, anti-foaming agents, preservatives, and the like can be added according to need as optional ingredients to the coating agent of the present invention in addition to the above-mentioned component A and component B.

The various additives listed above can be mixed with a conventional mixing and stirring device equipped with stirring impellers, such as a paddle- or anchor-type impellers. Then, the mixture can be diluted by adding water if necessary.

The coating agent of the present invention is applied to the surface of a substrate material by brush coating, roll coating, spray coating, knife coating, dip coating, or any other suitable method, and then the coated article is kept standing at room temperature or dried by heating to form a cured coating film.

The coating agent of the present invention is useful as a mold-release agent for plastic products and various rubber products such as tires. Because the coating film has good adhesion to the substrate surface, a metal mold, plastic mold, or rubber mold can be used repeatedly after being treated just once. Also, since coating a rubber article imparts lubricity to the surface, this coating agent is useful for weatherstrips of automobiles, O-rings, gaskets, various kinds of packing and other sealing members, rubber hose materials, and so on.

EXAMPLES

Measuring methods, preparation examples, working examples, and comparative examples are given to describe the present invention in more details, but the present invention is never limited to the following examples. The viscosity given in the following examples is the value determined at 25° C. measured with an Ostwald viscometer.

Measurement Methods

1. Surface Lubricity

Figure 1:
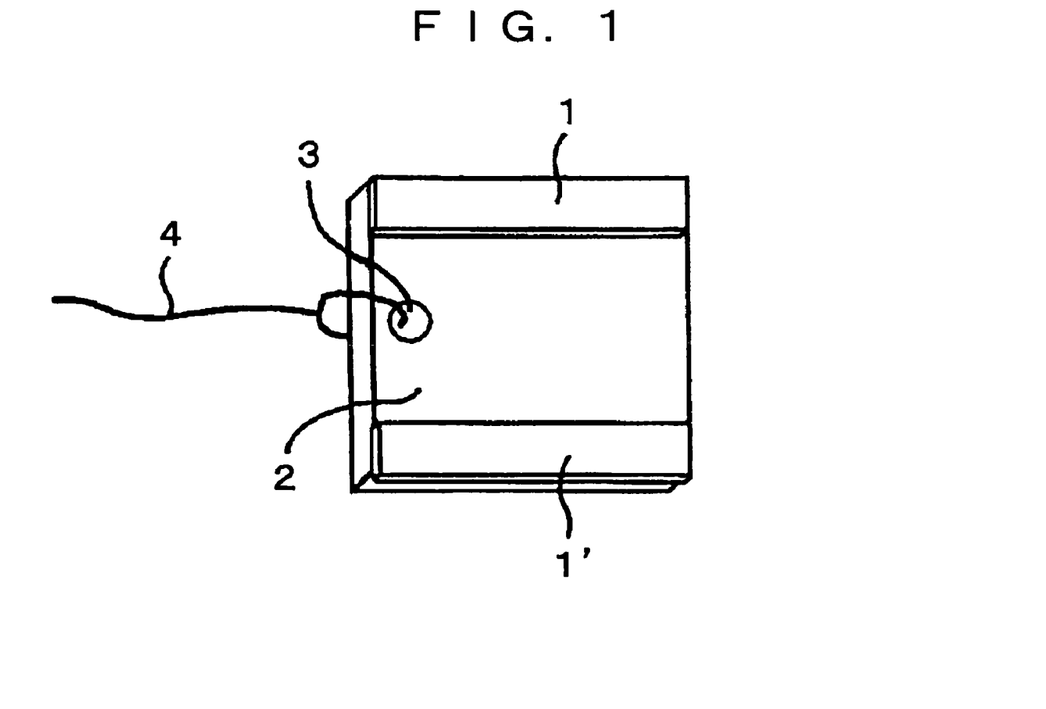
FIG. 1 is a perspective view of a test specimen used for evaluation of the surface smoothness of a coated article.

As shown in FIG. 1, two pieces of ethylene-propylene-diene copolymeric rubber 1 and 1' (10 mm by 50 mm by 2 mm thickness) were each coated by brush coating with the water-base coating composition under testing on one of the flat surfaces to serve as the test specimens which were bonded by using a double-sided pressure-sensitive adhesive tape to a surface of an iron plate 2 (50 mm by 150 mm by 0.2 mm thickness) along the opposite side lines.

Figure 2:
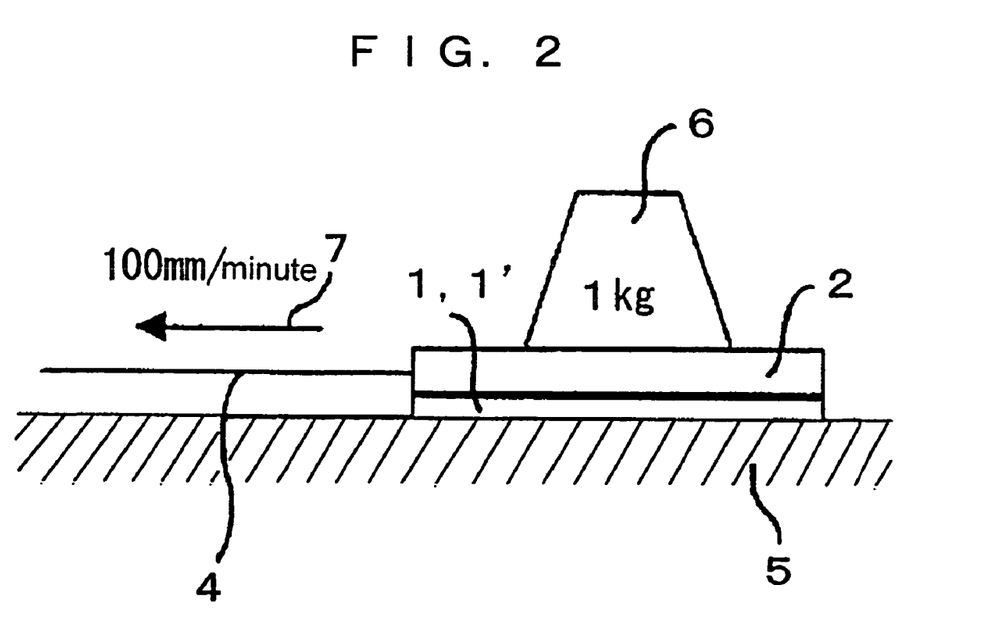
FIG. 2 is a schematic illustration of the method of measuring the dynamic coefficient of friction using the above-mentioned test specimen.

Next, as shown in FIG. 2, this test piece was mounted on a glass plate 5 (60 mm by 190 mm by 3 mm thickness) with the coated rubber surfaces facing down, and a load 6 (a weight of 1 kg) was mounted on this iron plate. The cord 4 tied to the hole 3 was then pulled horizontally in the pulling direction 7 (see arrow) to slide the test piece over the glass plate 5 at a pulling speed of 100 mm/minute. The dynamic coefficient of friction between the glass sheet and the coated sides of the rubber sheets 1 and 1' here was measured.

2. Adhesion

The surface of a butyl rubber sheet (50×50 mm, 2 mm thick), the surface of a polypropylene plate (50×50 mm, 2 mm thick), and the surface of an iron plate (50×150 mm, 0.2 mm thick) were brush-coated with a water-base resin composition (discussed below) to form a coating film, this coating film was strongly rubbed twice with the thumb, and the coating film was checked to see if the coating layer had been peeled off.

3. Releasability

The surfaces of a butyl rubber sheet (50×50 mm, 2 mm thick) and an iron plate (50×150 mm, 0.2 mm thick) were brush-coated with the water-base resin composition (discussed below) to form a coating film. A 1 g lump of unvulcanized butyl rubber was placed on the coated surface and sandwiched between iron plates, and heat and pressure were applied for 10 minutes at 190° C. and a load of 10 kg using a heater press (made by Shoji Tekko Co.) to vulcanize the unvulcanized butyl rubber. This product was allowed to cool for 30 minutes down to room temperature, after which the vulcanized butyl rubber was removed by hand, and checked to see how easily it came off.

PREPARATION EXAMPLES

Component A

Preparation Example 1

350 g of the organopolysiloxane represented by the following Formula 5 having a viscosity of 65 mm²/s, and 50 g of vinyltrimethoxysilane were taken in a 1000 ml glass beaker and stirred for 5 minutes with a homomixer. Next, 20 g of polyoxyethylene decyl ether (4 moles addition of ethylene oxide), 15 g of polyoxyethylene decyl ether (40 moles addition of ethylene oxide), and 265 g of water were added and stirred for 15 minutes with a homomixer, and this mixture was passed twice through a high-pressure homogenizer working at a pressure of 30 MPa, to give an aqueous silicone emulsion (curable aqueous silicone emulsion A-1).

After 24 hours from preparation of this silicone aqueous emulsion, a few grams portion thereof was taken on a petri dish, and water was allowed to evaporate by standing for 24 hours at room temperature to obtain a solid. This solid was found by finger touch to be elastic and non-tacky.

(5)

(Where $R^{13}$ is a group expressed by $-C_3H_6NHC_2H_4NH_2$.)

Preparation Example 2

350 g of the organopolysiloxane represented by the above Formula 5, having a viscosity of 65 mm²/s, and 35 g of vinyltrimethoxysilane were taken in a 1000 ml glass beaker and stirred for 5 minutes with a homomixer. Next, 20 g of polyoxyethylene decyl ether (4 moles addition of ethylene oxide), 15 g of polyoxyethylene decyl ether (40 moles addition of ethylene oxide), and 280 g of water were added and stirred for 15 minutes with a homomixer, and this mixture was passed twice through a high-pressure homogenizer working at a pressure of 30 MPa, to give an aqueous silicone emulsion (curable silicone aqueous emulsion A-2).

After 24 hours from preparation of this aqueous silicone emulsion, a few grams thereof were taken on a petri dish, and water was allowed to evaporate by standing for 24 hours at room temperature to obtain a solid. This solid was found by finger touch to be elastic and non-tacky.

Preparation Example 3

350 g of the organopolysiloxane represented by the above Formula 5, having a viscosity of 65 mm²/s, and 50 g of phenyltrimethoxysilane were taken in a 1000 ml glass beaker and stirred for 5 minutes with a homomixer. Next, 20 g of polyoxyethylene decyl ether (4 moles addition of ethylene oxide), 15 g of polyoxyethylene decyl ether (40 moles addition of ethylene oxide), and 265 g of water were added and stirred for 15 minutes with a homomixer, and this mixture was passed twice through a high-pressure homogenizer working at a pressure of 30 MPa, to give an aqueous silicone emulsion (curable silicone aqueous emulsion A-3).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 4

350 g of the organopolysiloxane represented by the above Formula 5, having a viscosity of 65 mm²/s, and 35 g of tetramethoxysilane were taken in a 1000 ml glass beaker and stirred for 5 minutes with a homomixer. Next, 20 g of polyoxyethylene decyl ether (4 moles addition of ethylene oxide), 15 g of polyoxyethylene decyl ether (40 moles addition of ethylene oxide), and 280 g of water were added and stirred for 15 minutes with a homomixer, and this mixture was passed twice through a high-pressure homogenizer working at a pressure of 30 MPa, to give an aqueous silicone emulsion (curable silicone aqueous emulsion A-4).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 5

280 g of the organopolysiloxane represented by the following Formula 6, having a viscosity of 770 mm²/s, and 11 g of vinyltrimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), 3 g of a 10% aqueous potassium carbonate solution, and 378 g of water were added and stirred for 15 minutes with a homomixer, and this mixture was passed twice through a high-pressure homogenizer working at a pressure of 100 MPa, to give an aqueous silicone emulsion (curable silicone aqueous emulsion A-5).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

(Where $R^{13}$ is a group represented by $-C_3H_6NHC_2H_4NH_2$)

Preparation Example 6

280 g of the organopolysiloxane represented by the following Formula 7 having a viscosity of 11,400 mm²/s, and 11 g of vinyltrimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 25 g of water were added and stirred with a homomixer to note an increase in the viscosity of the mixture. 3 g of an aqueous 10% potassium carbonate solution were added and the mixture was kneaded and blended for 10 minutes with a disper-mixer, and this mixture was diluted by the addition of another 353 g portion of water, to give an aqueous silicone emulsion (curable silicone aqueous emulsion A-6).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

(7)

(where $R^{13}$ is a group rep represented by $-C_3H_6NHC_2H_4NH_2$)

Preparation Example 7

280 g of the organopolysiloxane represented by the following Formula 8, having a viscosity of 112,000 mm$^2$/s, and 11 g of vinyltrimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note a viscosity increase of the mixture. 3 g of an aqueous 10% potassium carbonate solution were added and the mixture was kneaded and blended for 10 minutes with a disper-mixer, and this mixture was diluted by the addition of another 357 g portion of water, to give a silicone aqueous emulsion (curable silicone aqueous emulsion A-7).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

(8)

(where $R^{13}$ is a group represented by $-C_3H_6NHC_2H_4NH_2$.)

Preparation Example 8

280 g of the organopolysiloxane represented by the above Formula 8, having a viscosity of 112,000 mm$^2$/s, and 11 g of γ-acryloyloxypropyl trimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred for 5 minutes with a homomixer to note an increase in the viscosity of the mixture. 3 g of a 10% potassium carbonate aqueous solution were added and the mixture was kneaded and blended for 10 minutes with a disper-mixer, and this mixture was diluted by the addition of another 357 g portion of water, to give a silicone aqueous emulsion (curable silicone aqueous emulsion A-8).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 9

280 g of the organopolysiloxane represented by the above Formula 8, having a viscosity of 112,000 mm$^2$/s, and 11 g of 3,3,3-trifluoropropyl trimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer to note an increase in the viscosity of the mixture. 3 g of a 10% potassium carbonate aqueous solution were added and the mixture was kneaded and blended for 10 minutes with a disper-mixer, and this mixture was diluted by the addition of another 357 g portion of water, to give a silicone aqueous emulsion (curable silicone aqueous emulsion A-9).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 10

280 g of the organopolysiloxane represented by the above Formula 8, having a viscosity of 112,000 mm$^2$/s, were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and blended for 10 minutes with a disper-mixer, and then this mixture was diluted by the addition of another 355 g portion of water, then 11 g of vinyltrimethoxysilane and 5 g of a mineral spirits solution of iron 2-ethylhexanoate (metallic iron content: 8%) were added, and the mixture was stirred for 1 hour with an anchor-blade stirrer to give a silicone aqueous emulsion (curable silicone aqueous emulsion A-10).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 11

280 g of the organopolysiloxane represented by the above Formula 8, having a viscosity of 112,000 mm$^2$/s, and 14 g of phenyltriethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles additions of ethylene oxide), and 21 g of water were added and stirred with a homomixer to note an increase in the viscosity of the mixture. The mixture was then kneaded and blended for 10 minutes with a disper-mixer and thereafter this mixture was diluted by the addition of another 351 g portion of water, then 6 g of a mineral spirit solution of zirconium 2-ethylhexanoate (metallic zirconium content: 12%) were added, and the mixture was stirred for 1 hour with an anchor-blade stirrer to give a silicone aqueous emulsion (curable silicone aqueous emulsion A-11).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 12

280 g of the organopolysiloxane represented by the above Formula 8, having a viscosity of 112,000 mm²/s, and 11 g of tetraethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and blended for 10 minutes with a disper-mixer, and then this mixture was diluted by the addition of another 342 g portion of water, then 18 g of a toluene solution of vanadium naphthenate (metallic vanadium content: 2%) were added, and the mixture was stirred for 1 hour with an anchor-blade stirrer, to give a silicone aqueous emulsion (curable silicone aqueous emulsion A-12).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 13

280 g of the organopolysiloxane represented by the above Formula 8, having a viscosity of 112,000 mm²/s, and 11 g of methyltriethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and blended for 10 minutes with a disper-mixer, and then this mixture was diluted by the addition of another 353 g portion of water, then 7 g of a toluene solution of nickel 2-ethylhexanoate (metallic nickel content: 6%) was added, and the mixture was stirred for 1 hour with an anchor-blade stirrer, to give a silicone aqueous emulsion (curable silicone aqueous emulsion A-13).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 14

280 g of the organopolysiloxane represented by the above Formula 8, having a viscosity of 112,000 mm²/s, and 17 g of γ-acryloyloxypropyl triethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and blended for 10 minutes with a disper-mixer, and then this mixture was diluted by the addition of another 342 g portion of water, then 12 g of a toluene solution of barium 2-ethylhexanoate (metallic barium content: 8%) were added, and the mixture was stirred for 1 hour with an anchor-blade stirrer to give a silicone aqueous emulsion (curable silicone aqueous emulsion A-14).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 15

280 g of the organopolysiloxane represented by the above Formula 8, having a viscosity of 112,000 mm²/s, and 11 g of methyltriethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and blended for 10 minutes with a disper-mixer, and then this mixture was diluted by the addition of another 356 g portion of water, then 4 g of a mineral spirit solution of cobalt 2-ethylhexanoate (metallic cobalt content: 12%) were added, and the mixture was stirred for 1 hour with an anchor-blade stirrer to give a silicone aqueous emulsion (curable silicone aqueous emulsion A-15).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 16

280 g of the organopolysiloxane represented by the following Formula 9 having a viscosity of 232,000 mm²/s, and 11 g of methyl triethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. 1 g of calcium chloride dihydrate was added, and the mixture was kneaded and blended for 10 minutes with a disper-mixer, and then this mixture was diluted by the addition of another 359 g portion of water, to give a silicone aqueous emulsion (curable silicone aqueous emulsion A-16).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

(9)

(where $R^{13}$ is a —$C_3H_6NHC_2H_4NH_2$ group.)

Preparation Example 17

280 g of the organopolysiloxane represented by the above Formula 9, having a viscosity of 232,000 mm²/s, and 2 g of aluminum dibutoxyacetylacetonate were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. The mixture was kneaded and stirred for 10 minutes with a disper-mixer, and then this mixture was diluted by the addition of another 358 g portion of water, 11 g of methyltrimethoxysilane were added, and the mixture was stirred for 1 hour with an anchor-blade stirrer, to give a silicone aqueous emulsion (curable silicone aqueous emulsion A-17).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 18

280 g of the organopolysiloxane represented by the above Formula 9, having a viscosity of 232,000 mm²/s, and 11 g of methyltriethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer, to note an increase in the viscosity of the mixture. 3 g of a 10% sodium carbonate aqueous solution were added, the mixture was kneaded and blended for 10 minutes with a disper-mixer, and this mixture was diluted by the addition of another 357 g portion of water, to give a silicone aqueous emulsion (curable silicone aqueous emulsion A-18).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 19

280 g of the organopolysiloxane represented by the above Formula 8, having a viscosity of 112,000 mm²/s were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide), and 21 g of water were added and stirred with a homomixer to note an increase in the viscosity of the mixture. The mixture was kneaded and blended for 10 minutes with a disper-mixer, this mixture was diluted by the addition of another 355 g portion of water, 11 g of vinyltriethoxysilane and 5 g of a mineral spirit solution of zinc 2-ethylhexanoate (metallic zinc content: 8%) were added, and the mixture was stirred for 1 hour with an anchor-blade stirrer, to give a silicone aqueous emulsion (curable silicone aqueous emulsion A-19).

After 24 hours from preparation of this silicone aqueous emulsion, a few grams thereof were taken on a petri dish, and water was allowed to evaporate by standing for 24 hours at room temperature to obtain a solid. This solid was found by finger touch to be elastic and non-tacky.

Preparation Example 20

350 g of the organopolysiloxane expressed by the following Formula 10, having a viscosity of 62 mm²/s, and 50 g of vinyltrimethoxysilane were taken in a 1000 ml glass beaker and stirred for 5 minutes with a homomixer. Next, 20 g of polyoxyethylene decyl ether (4 moles addition of ethylene oxide), 15 g of polyoxyethylene decyl ether (40 moles addition of ethylene oxide), 3 g of a 10% potassium carbonate aqueous solution, and 262 g of water were added and stirred for 15 minutes with a homomixer, and the mixture was passed twice through a high-pressure homogenizer working at a pressure of 30 MPa, to give a silicone emulsion. This was diluted by the addition of another 359 g portion of water, to give a silicone aqueous emulsion (curable silicone aqueous emulsion A-20).

After 24 hours from preparation of this silicone aqueous emulsion, a few grams thereof were taken on a petri dish, and water was allowed to evaporate by standing for 24 hours at room temperature, but the residue remained liquid and the silicone could not be cured.

Preparation Example 21

280 g of the organopolysiloxane expressed by the following Formula 11, having a viscosity of 750 mm²/s, and 15 g of vinyltrimethoxysilane were taken in a 1000 ml glass beaker and stirred for 5 minutes with a homomixer. Next, 16 g of polyoxyethylene decyl ether (4 moles addition of ethylene oxide), 12 g of polyoxyethylene decyl ether (40 moles addition of ethylene oxide) and 371 g of water were added and stirred for 15 minutes with a homomixer, and the mixture was passed twice through a high-pressure homogenizer working at a pressure of 100 MPa. To this mixture were added 6 g of a mineral spirit solution of zirconium 2-ethylhexanoate (metallic zirconium content: 12%), and the mixture was stirred for 1 hour with an anchor-blade stirrer, to give a silicone aqueous emulsion (curable silicone aqueous emulsion A-21).

After 24 hours from preparation of this silicone aqueous emulsion, a few grams thereof were taken on a petri dish, and water was allowed to evaporate by standing for 24 hours at room temperature, but the residue remained liquid and the silicone could not be cured.

(Where $R^{13}$ is a —$C_3H_6NHC_2H_4NH_2$ group.)

Characterization of Components B

Aqueous Polyurethane Resin Emulsion B-1:
 Superflex 600 (trade name by Daiichi Kogyo Seiyaku Co.; ether type; non-volatile e matter: 5% by mass)

Aqueous Polyurethane Resin Emulsion B-2:
 Superflex 15OHS (trade name by Daiichi Kogyo Seiyaku Co.; ester-ether type; non-volatile mafter: 38% by mass)

Aqueous Polyurethane Resin Emulsion B-3:
 Superflex 420NS (trade name by Daiichi Kogyo Seiyaku Co.; carbonate type; non-volatile mafter: 32% by mass)

Examples 1 to 23

One of the components A (silicone emulsions A-1 to A-19) and one of the components B (polyurethane emulsions B-1 to B-3) described above were taken in the amounts indicated in Tables 1 and 2 below and uniformly mixed together with an anchor-blade stirrer to prepare water-base resin compositions as a coating agent.

Each of these compositions was applied by brush coating to the surface of an ethylene-propylene-diene rubber sheet, an iron plate, a polypropylene plate, and a butyl rubber sheet, then heated for 5 minutes in a hot-air circulation thermostat at 150° C. to form a coating film. Each film was tested and evaluated for surface lubricity, adhesion, and releasability by the methods 1 to 3 described before. The results are shown in Tables 1 and 2.

Comparative Examples 1 to 4

Water-base resin compositions were prepared as coating agents in the same manner as in Examples 1 to 23, except that the following component A-20 or A-21 was also used as an additional component A according to need besides the component A and component B obtained in the above Preparation Examples.

The components A and B prepared above were combined in the amounts (in grams shown in Table 3, and water-base resin compositions were prepared by the above procedure such that component A and component B (the effective components in the tables) were in the mass ratios given in Table 3 (the numerical values in the table indicate mass parts). Using these compositions, an ethylene-propylene-diene rubber sheet, an iron plate, a polypropylene plate, and a butyl rubber sheet were surface-treated in the same manner as in the working examples, and surface lubricity, adhesion, and releasability were measured and evaluated according to the methods 1 to 3 described above. These results are given in Table 3.

TABLES 1 AND 2 (COMBINED)

| Example No. | Amounts taken, g | | Relative amounts A:B (effective) | Dynamic friction coeff, | Adhesion to | | | Releasability from | |
|---|---|---|---|---|---|---|---|---|---|
| | Component A | Component B | | | rubber | plastic | metal | rubber | metal |
| 1 | A-1:52.2 | B-1:47.8 | 100:40 | 0.6 | good | good | good | good | good |
| 2 | A-2:53.2 | B-1:46.8 | 100:40 | 0.6 | good | good | good | good | good |
| 3 | A-3:52.2 | B-1:47.8 | 100:40 | 0.6 | good | good | good | good | good |
| 4 | A-4:53.2 | B-1:46.8 | 100:40 | 0.7 | good | good | good | good | good |
| 5 | A-5:60.0 | B-1:40.0 | 100:40 | 0.6 | good | good | good | good | good |
| 6 | A-6:60.0 | B-1:40.0 | 100:40 | 0.7 | good | good | good | good | good |
| 7 | A-7:60.0 | B-1:40.0 | 100:40 | 0.7 | good | good | good | good | good |
| 8 | A-7:70.6 | B-1:29.4 | 100:25 | 0.8 | good | good | good | good | good |
| 9 | A-7:42.9 | B-1:57.1 | 100:80 | 0.8 | good | good | good | good | good |
| 10 | A-7:69.6 | B-2:30.4 | 100:40 | 0.7 | good | good | good | good | good |
| 11 | A-7:65.8 | B-3:34.2 | 100:40 | 0.7 | good | good | good | good | good |
| 12 | A-8:60.0 | B-1:40.0 | 100:40 | 0.7 | good | good | good | good | good |
| 13 | A-9:60.0 | B-1:40.0 | 100:40 | 0.7 | good | good | good | good | good |
| 14 | A-10:59.8 | B-1:40.2 | 100:40 | 0.6 | good | good | good | good | good |
| 15 | A-11:59.6 | B-1:40.4 | 100:40 | 0.7 | good | good | good | good | good |
| 16 | A-12:59.6 | B-1:40.4 | 100:40 | 0.8 | good | good | good | good | good |
| 17 | A-13:59.9 | B-1:40.1 | 100:40 | 0.7 | good | good | good | good | good |
| 18 | A-14:59.1 | B-1:40.9 | 100:40 | 0.7 | good | good | good | good | good |
| 19 | A-15:59.9 | B-1:40.9 | 100:40 | 0.7 | good | good | good | good | good |
| 20 | A-16:60.0 | B-1:40.0 | 100:40 | 0.7 | good | good | good | good | good |
| 21 | A-17:59.9 | B-1:40.9 | 100:40 | 0.6 | good | good | good | good | good |
| 22 | A-18:60.0 | B-1:40.0 | 100:40 | 0.7 | good | good | good | good | good |
| 23 | A-19:59.8 | B-1:40.2 | 100:40 | 0.6 | good | good | good | good | good |

TABLE 3

| Comparative example | Amounts taken, g | | Relative amounts A:B (effective) | Dynamic friction coeff. | Adhesion to | | | Releasability from | |
|---|---|---|---|---|---|---|---|---|---|
| | Component A | Component B | | | rubber | plastic | metal | rubber | metal |
| 1 | A-20:52.2 | B-1:47.8 | 100:40 | 1.0 | no good | no good | no good | good | good |
| 2 | A-21:59.5 | B-1:40.5 | 100:40 | 0.9 | no good | no good | no good | good | good |
| 3 | A-7:100 | | 100:0 | 1.3 | no good | no good | no good | good | good |
| 4 | A-7:19.4 | B-1:80.6 | 100:250 | 0.9 | good | good | good | good | good |

Evaluation

As can be seen from the above results, surface lubricity, adhesion, and releasability were all good in Working Examples 1 to 23 each according to the present invention.

In contrast, with an organopolysiloxane in which the component (A-1) did not contain a group represented by Formula 1, as in Comparative Example 1, the curability of component A was insufficient, and as a result, the coating film thus obtained had poor surface lubricity and adhesion.

With an organopolysiloxane in which component (A-1) contained a group represented by Formula 1, but on a side chain rather than at a molecular chain terminal, as in Comparative Example 2, the curability of the component A was insufficient, and as a result, the coating film thus obtained had poor surface lubricity and adhesion.

When the polyurethane resin of component B was not added, as in Comparative Example 3, the coating film thus obtained had poor surface smoothness and adhesion.

When the polyurethane resin as the component B was added in a large amount, as in Comparative Example 4, it can be seen that the coating film thus obtained had poor surface lubricity and adhesion.

What is claimed is:

1. A coating agent which is a water-base resin composition comprising:
   (A) 100 parts by mass of a curable silicone composition which comprises:
   (A-1) an organopolysiloxane having a molecular structure represented by the formula in which each $R^9$ is, independently from the others, a hydrogen atom or a monovalent hydrocarbon group having 1 to 6 carbon atoms, each $R^{10}$ is, independently from the others, a monovalent hydrocarbon group having 1 to 20 carbon atoms, each $R^{11}$ is a group represented by the formula in which $R^2$ is an optionally substituted divalent hydrocarbon group having 1 to 6 carbon atoms, $R^3$ is a divalent hydrocarbon group having 1 to 4 carbon atoms, $R^4$, $R^5$ and $R^6$ are each a hydrogen atom or an optionally substituted monovalent hydrocarbon group having 1 to 10 carbon atoms and the subscript m is an integer of 0 to 6 with the proviso that, when m is not 0, at least one of $R^4$, $R^5$ and $R^6$ is a hydrogen atom and, when m is 0, at least one of $R^5$ and $R^6$ is a hydrogen atom, as bonded to one and the same silicon atom at each of two or more terminals of the organopolysiloxane chain; and
   each $R^{12}$ is, independently from the others, a monovalent hydrocarbon group having 1 to 20 carbon atoms and the subscript n is an average number of 10 to 2000;
   (A-2) an alkoxy silane compound represented by the formula $$R^7{}_a Si(OR^8)_{4-a},$$

in which $R^7$ is a monovalent hydrocarbon group having 1 to 20 carbon atoms, $R^8$ is, each independently from the others, a monovalent hydrocarbon group having 1 to 6 carbon atoms and the subscript a is 0 or 1, or a partial hydrolysis-condensation product thereof; and, optionally,
   (A-3) a condensation catalyst in an amount not exceeding 10 parts by mass per 100 parts by mass of the total amount of the component (A-1) and component (A-2); and
   (B) from 10 to 200 parts by mass of a polyurethane resin.

2. The coating agent as claimed in claim 1 wherein the amount of the component (A-2) relative to the component (A-1) is such that from 0.5 to 100 moles of the groups of the formula $R^8O$— in the component (A-2) are provided per mole of the total amount of the hydroxyl groups and the groups of the formula $R^1O$—.

3. The coating agent as claimed in claim 1 wherein the alkoxy silane compound as the component (A-2) is selected from the group consisting of methyl trimethoxy silane, methyl triethoxy silane, phenyl trimethoxy silane, phenyl triethoxy silane, vinyl trimethoxy silane, vinyl triethoxy silane, 3-acryloyloxypropyl trimethoxy silane, 3-acryloyloxypropyl triethoxy silane, 3-methacryloyloxypropyl trimethoxy silane, 3-methacryloyloxypropyl triethoxy silane, 3,3,3-trifluoropropyl trimethoxy silane, 3,3,3-trifluoropropyl triethoxy silane, tetramethoxy silane and tetraethoxy silane.

4. The coating agent as claimed in claim 1 wherein the condensation catalyst as the component (A-3) is selected from the group consisting of sodium compounds, aluminum compounds, potassium compounds, calcium compounds, vanadium compounds, iron compounds, cobalt compounds, nickel compounds, zinc compounds, zirconium compounds and barium compounds.

5. An article having a coating layer thereon as formed by coating with the coating agent according to claim 1.

* * * * *